FIG. 1.
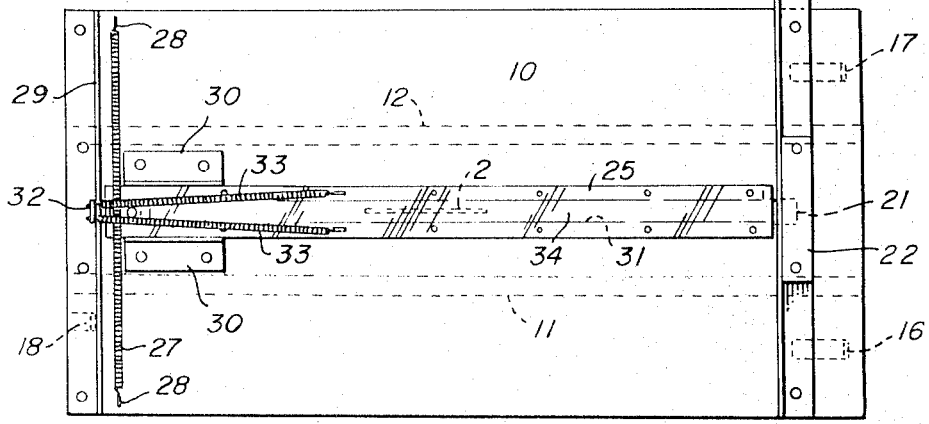
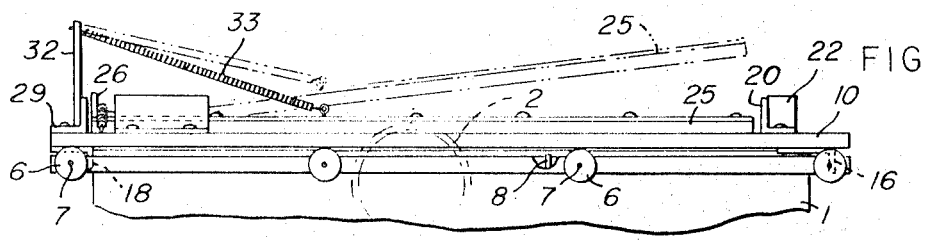
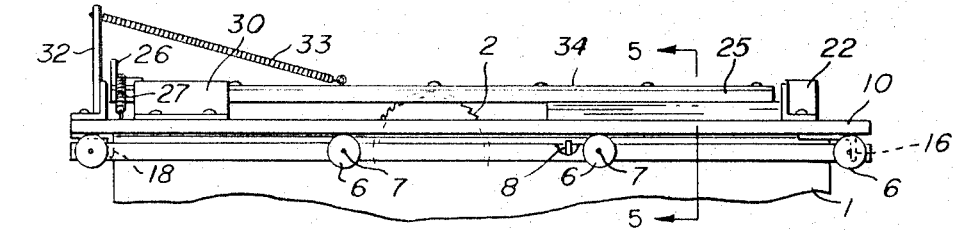
FIG. 3.
FIG. 4.
INVENTOR.
HENRY H. FERNEYHOUGH
ATTORNEY.

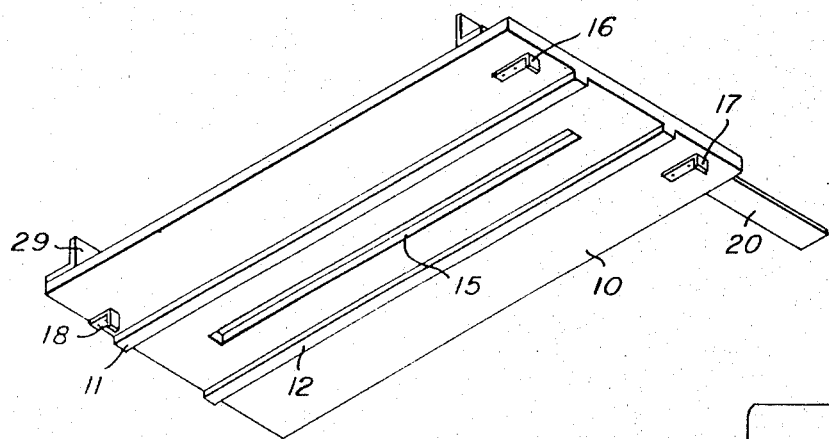
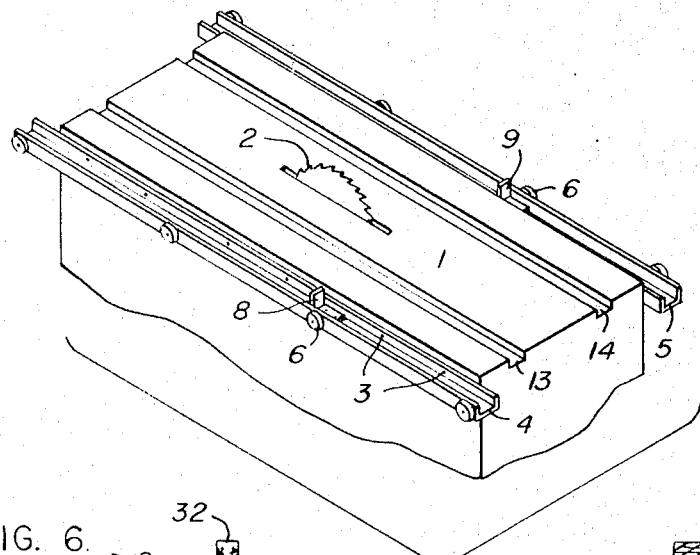
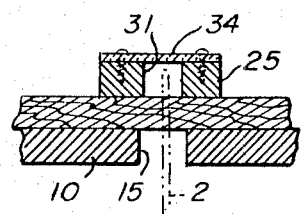
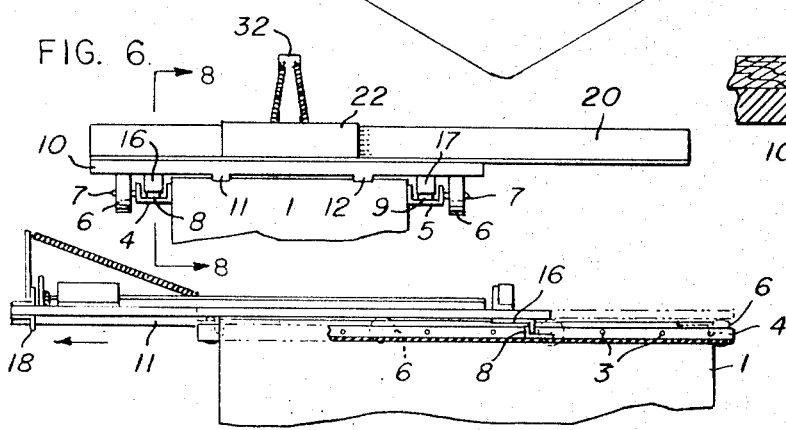
FIG. 7.
FIG. 5.
FIG. 6.
FIG. 8.
INVENTOR.
HENRY H. FERNEYHOUGH
BY
ATTORNEY.

United States Patent Office 3,451,447
Patented June 24, 1969

3,451,447
AUXILIARY TABLE AND WORK HOLDING
MEANS FOR POWER SAWS AND THE LIKE
Henry H. Ferneyhough, Deaver Road,
Wyncote, Pa. 19095
Filed Mar. 29, 1967, Ser. No. 626,779
Int. Cl. B27b 5/02, 9/02
U.S. Cl. 143—51            6 Claims

ABSTRACT OF THE DISCLOSURE

An auxiliary saw table for a power driven circular saw or other cutting or grinding tool supporting the work for movement along a path normal to the plane of the tool including a movable hold down guard carried by the auxiliary table adapted to overlie and hold the work disposed on the table and extend parallel thereto independently of the thickness of the work to shield the hands of the operator from contact with the tool.

Background of the invention

In saw mills for converting logs to lumber it has long been the practice to provide a carriage for the log movable with it relatively to a rotating circular saw used for cutting the log but in power driven saws smaller in scale such as those used by home craftsmen and other non-professional workers in wood and the like it is substantially universal practice to provide saw tables adjustable in height relatively to the saw but fixed with relation thereto when in use, requiring that the work be slid over the table, whereby not only is considerable frictional resistance to free movement of the work piece offered, making accurate work needlessly difficult and tiring but risk of marring highly finished surfaces on the work incurred.

I am aware that movable saw tables have been suggested for power saws of this general character, but these have been cumbersome, complicated and unsatisfactory for association with power saws having relatively fixed tables as generally offered in the open market.

Summary of the invention

It is therefore a principal object of the invention to provide a movable auxiliary table adapted for association and combination with standard or generally available power driven circular saws and the like power tools having relatively fixed tables to provide for a work piece a moving support carried on antifriction bearings to enable the work piece to be presented to the tool relatively effortlessly whereby to enhance the accuracy and ease with which the action of the tool upon it is effected, and as an element of the combination, a hold down guard movably mounted on the auxiliary table adapted to overlie the work and promote the safety of the operator by affording protection against flying chips, particles of sawdust and the like as well as excluding body parts from contact with the tool.

Other objects, purposes and advantages of the invention will hereinafter more fully appear or will be understood from the following.

Brief description of the drawings

FIG. 1 illustrates in top plan a preferred embodiment of the invention as comprised in an auxiliary table and guard for a power driven circular saw assembly of known character, of which only the saw blade itself appears in this figure;

FIG. 2 is a fragmentary side elevation of the assembly showing the auxiliary table and guard mounted thereon;

FIG. 3 is a view similar to FIG. 2 but showing the auxiliary table and its associated guard adjusted to accommodate a work piece of substantial thickness diagrammatically illustrated therein;

FIG. 4 is an enlarged fragmentary perspective detail of the means preferred for mounting said guard on the auxiliary table;

FIG. 5 is a similarly enlarged fragmentary vertical section on line 5—5 in FIG. 3;

FIG. 6 is a fragmentary front elevation of the saw and auxiliary table illustrated by other views in FIGS. 1, 2 and 3;

FIG. 7 is an exploded composite perspective view showing the auxiliary table from below and the basic saw assembly with its attached supports for the auxiliary table from an offset elevated viewpoint, and FIG. 8 is a fragmentary section on line 8—8 in FIG. 6 but on a smaller scale of the saw assembly with the auxiliary table of my invention operatively associated therewith.

Description of the preferred embodiment

As illustrated in the drawings, in which saw table 1 may be considered as representative of the bed or main table of a typical power tool such as a circular saw assembly the blade 2 of which projects above the table, in accordance with the invention there are attached by screws 3 to the sides of table 1 in parallelism with the plane of the saw a pair of tracks 4, 5 perferably channels of steel, aluminum or other suitable material each carrying on the outside of its outer web a series of rollers 6 rotatable on antifriction bearings carried on stub shafts 7 secured to the channels and tangent to a plane parallel with table 1 and slightly above it. Interposed in the channels of tracks 4, 5 at suitable distances from their ends are angle stops 8, 9 the functions of which will hereinafter appear.

Thus tracks 4, 5 support through rollers 6 and slightly above table 1, an auxiliary table 10, which may be made of plywood, pressed board or any other rigid sheet material or of metal plate if preferred, and guide ribs 11, 12 secured to its under face are adapted for engagement with table 1 in its customary grooved miter guide ways 13, 14 which parallel the saw plane to confine the auxiliary table to rectilinear reciprocation on rollers 6.

The auxiliary table thus movable on antifriction bearings parallel to the plane of the saw is provided with a slot 15 through which the latter projects when the auxiliary table is disposed in operative position above the main table, and depending detents 16, 17 near its front end aligned with the track channels move with the auxiliary table until contact with stops 8, 9 is made, this contact serving to impose a limit in one direction, herein termed the forward direction, to movement of the auxiliary table; its movement in the opposite or rearward direction is limited by engagement of another depending detent 18 near its rear edge positioned to contact the adjacent edge of main table 1.

The auxiliary table is employed to support a work piece W for horizontal movement toward the saw which projects through it in slot 15 and with the saw rotating the piece may then be easily severed thereby. However, for protection of the operator and also to facilitate accuracy in maintaining rectilinear travel of the work piece with the auxiliary table I mount near the front of the latter a transverse guide bar comprising an angle 20 extending the full width of the auxiliary table and if desired projecting somewhat beyond one or both side edges thereof. This guide bar has a short slot 21 registering with slot 15 in the auxiliary table, and a block 22 on the bar aligned with said slots provides a safety hand grip to protect the operator's hands and fingers from contact with the saw.

For further protection against contact with the latter as well as from flying fragments I provide a safety hold down guard 25 disposed on the auxiliary table through a novel mounting affording compound movements which enable it to accommodate itself to work pieces of different thicknesses. More particularly at its rear end the guard carries an angle bracket 26 which is engaged by a coil tension spring 27 extending transversely of the auxiliary table near its rear edge with clips 28 connecting its ends thereto, the spring overlying guard 25 and with transverse angle bar 29 at the table edge yieldingly holding guard 25 attached to the table but free to swing more or less pivotally in a vertical plane or to translate vertically when a work piece of unusual thickness is encountered, the upwardly directed cheeks of guide angles 30 oppositely spaced from slot 15 in the auxiliary table confining the guard laterally and holding it parallel to said slot and a longitudinal slot 31 in the guard in registry with the latter.

A spring anchoring post 32 is projected upwardly from angle bar 29 at its center and receives one end of each of two coil springs 33 the other ends of which are attached to the guide to yieldingly maintain the latter angularly raised from the table when not in use. To prevent escape of chips, sawdust or the like but permitting the work of the cutting tool to be viewed, a plastic or other transparent strip 34 is disposed over slot 31; desirably one of the tines of guard 25 is shortened at its free end to provide a chip discharge port 35 when the guard is depressed to the level of the table or but little above it in engagement with a work piece.

Operation

The operation of my novel auxiliary table and safety guard as above described will now be discussed in greater detail, more particularly with reference to it in association with a powered circular saw as shown, but without restricting its use thereto in any way.

Thus, with the auxiliary table disposed above the side rails attached to the main saw table and free to move on its supporting rollers in the plane of the saw but retracted toward the front, a work piece may be placed thereon in engagement with angle 20 and beneath now raised guard 25 with the line along which a cut or kerf is to be made in it aligned with the saw. Appropriate adjustment of the relation of the saw blade 2 and table 1 next is preferably made to enable the edge of the saw to project above the auxiliary table surface slightly farther than the thickness of the work piece and the guard is now pushed down against the bias of springs 33 to engage the work piece and by continued manual pressure from above to clamp it on the table, the rear end of the guard rising from the latter against the bias of spring 27 if the thickness of the work piece is such as to so require. The entire auxiliary table and its burden may now very easily be moved from front to rear and as the saw encounters and cuts into the work piece the operator may observe its action through transparent strip 34 which prevents sawdust or chips being thrown into his eyes.

As the travel of the table is completed the slot 21 in angle 20 receives the saw as stops 8, 9 engage detents 16, 17 to prevent movement of the table beyond a limit position at which the operator's fingers or hands placed on block 22 are protected from contact with the saw blade.

After the function of the saw has been completed, either by severing the work piece or by forming a kerf in it, the auxiliary table may be retracted and the guard released; the apparatus after removal of the work is now ready to repeat the cycle with another piece or with one of the parts of the preceding one.

It will thus be appreciated that while there has been herein shown and described a preferred embodiment of the invention associated with a power driven circular saw, like principles may be utilized in the construction and operation of auxiliary tables and guards designed more particularly for association with other power tools, such as routers, joiners, sanders, shapers and the like and that changes and modifications in the form, construction, design, arrangement and relationship of the several parts and components of said preferred embodiment or its equivalent will readily occur to those skilled in the art and may be utilized if desired without departing from the spirit and scope of the invention as defined in the appended claims.

I claim:

1. In combination with a stationary table including a power tool projecting upwardly therethrough for fragmenting a work piece, rails paralleling and supported proximate the sides of the table, rollers carried by the rails, an auxiliary table disposed on the rollers for reciprocation relatively to the tool having a slot for passage of the latter, a guard extending above the tool having an elongated slot for its reception, means supporting the guard from the auxiliary table for vertical movement relatively thereto including yielding means extending transversely of the table and overlying one end of the guard, means restraining the yielding means from disengagement from the guard, and means confining movement of the proximate end of the guard substantially to a vertical plane.

2. The combination defined in claim 1 in which the auxiliary table supports an upstanding post and yielding means extend between the post and the guard for biasing the guard angularly upward from the table.

3. The combination defined in claim 1 in which the confining means are carried by the auxiliary table and comprise a pair of parallel guides oppositely disposed with respect to the guard proximate said end.

4. The combination defined in claim 1 in which the auxiliary table supports a transverse bar secured thereto spanning the slot in the table through which the tool extends and a block is secured to the bar in alignment with said slot.

5. The combination defined in claim 1 in which the rails comprise channel shaped members, a stop is disposed in each thereof and detents depending from said auxiliary table are aligned with said stops for engagement therewith to limit travel of said table in one direction relatively to the stationary table.

6. The combination as defined in claim 1 in which a detent depends from the auxiliary table adapted to engage an edge of the stationary table to limit travel of the auxiliary table in one direction.

References Cited

UNITED STATES PATENTS 2,929,414 3/1960 Johnson.
2,966,177 12/1960 Weiskopf.

ANDREW R. JUHASZ, *Primary Examiner.*

G. WEIDENFELD, *Assistant Examiner.*

U.S. Cl. X.R.

143—159